June 21, 1960  I. M. ROSEMAN  2,941,577
SEAM FORMING METHOD AND APPARATUS
Filed June 11, 1956  2 Sheets-Sheet 1

INVENTOR.
ISADORE M. ROSEMAN
BY
ATTORNEYS

June 21, 1960  I. M. ROSEMAN  2,941,577
SEAM FORMING METHOD AND APPARATUS
Filed June 11, 1956  2 Sheets-Sheet 2

INVENTOR.
ISADORE M. ROSEMAN
BY
ATTORNEYS

United States Patent Office 2,941,577
Patented June 21, 1960

2,941,577

SEAM FORMING METHOD AND APPARATUS

Isadore M. Roseman, Newton, Mass., assignor to Cable Raincoat Company, Boston, Mass., a corporation of Massachusetts Filed June 11, 1956, Ser. No. 590,531

5 Claims. (Cl. 154—42)

The present invention relates generally to the art of seam construction in flexible fabric. More particularly, it relates to a process for tacking together a plurality of layers or margins of fabric having unequal curvatures to form an overlapping seam, and to a fabric article of manuafcture having such a seam. By "unequal," I mean that the layers or margins do not coincide exactly without distortion when superposed in overlapping relationship upon a flat surface because of their curvatures, one example out of many being the armhole seam by which the sleeve of a garment is secured to the body thereof.

An important object of this invention is to provide a process of tacking fabrics for overlapping seam construction that is adapted to the manufacture of articles of unsupported vinyl plastic sheeting, plastic-coated sheeting, or other similar sheet material. More particularly, it is an object of this invention to provide a method of handling and tacking plastic sheet material for application of a suitable form of heat to form an overlapping seam therein.

Another object is to provide a process for making an overlapping seam in a plastic article of manufacture, such seam being formed of a plurality of margins of unequal curvatures.

A further object is to provide an improved construction for plastic goods, for example rainwear and the like, whereby the seams subjected to substantial stresses in tension are of the improved, overlapping form having the property of resisting such forces with a strength equal to or exceeding that of a single thickness of the material.

A still further object is to provide a seam construction that may be applied to plastic or similar articles of manufacture, the application of which to the goods by dielectric heating or other similar process does not weaken the fabric at or adjacent the seam, thereby reducing the strength of either the seam or the adjacnt fabric, or both.

A still further object is to provide a tacking process and apparatus that is adapted to form an overlapping seam of complex curvature by the use of a seam-forming heating or pressing element that is itself either straight or of predetermined, fixed curvature.

Another object is to provide apparatus and methods of seam construction adapted to mass production, requiring a minimum of human effort and skill while attaining strict quality control of the product, uniformity of construction, and high speed of production.

With the above and other objects in view, the features of the invention reside in the novel method and apparatus described herein for tacking fabrics having margins of unequal curvature, to provide an overlapping seam by the application of a dielectric heating element or other similar heating or pressing element thereto.

Another feature resides in an article of manufacture constructed with an overlapping seam at any location, including but not restricted to the armhole seam in wearing apparel, where relatively extreme tensile stresses thereupon are so applied as to stress the fabric adjacent the seam, as well as to tend to open the seam itself.

Other features reside in certain methods, apparatus, modes of operation and articles of manufacture resulting therefrom, which will become clear from a study of the following specification, having reference to the appended drawings, in which.

Figure 5:
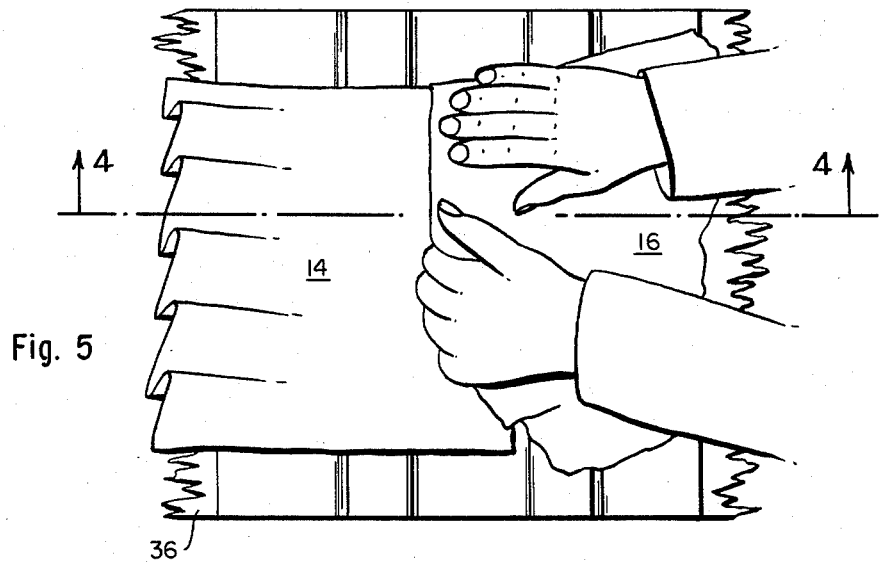
Figure 4:
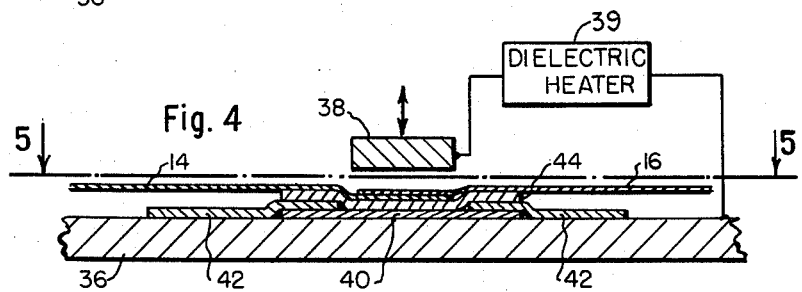

Fig. 4 is an elevation in section of a fixture adapted for tacking a plurality of margins or layers of fabric, preparatory to the forming of an overlapping seam therebetween by the application of a dielectric heating element thereto in accordance with the process of my invention; and Fig. 5 is a plan view of the fixture of Fig. 4, illustrating the process of tracking a fabric having a margin of non-rectilinear form.

The invention is disclosed herein with specific reference to the art of fabricating articles of manufacture from vinyl plastic sheet material, for example plastic raincoats, but it will be understood that the principles are applicable to other articles of manufacture incorporating overlapping seams formed of fabric margins of unequal curvatures.

The invention is also disclosed with specific reference to the art of seam construction by the application of dielectric heat to solid plastic or plastic-coated sheet material. However, it will be further understood that the teachings herein have concrete and valuable application to other forms of seam construction such as cementing, with or without the application of heat to the fabric.

Figure 1:
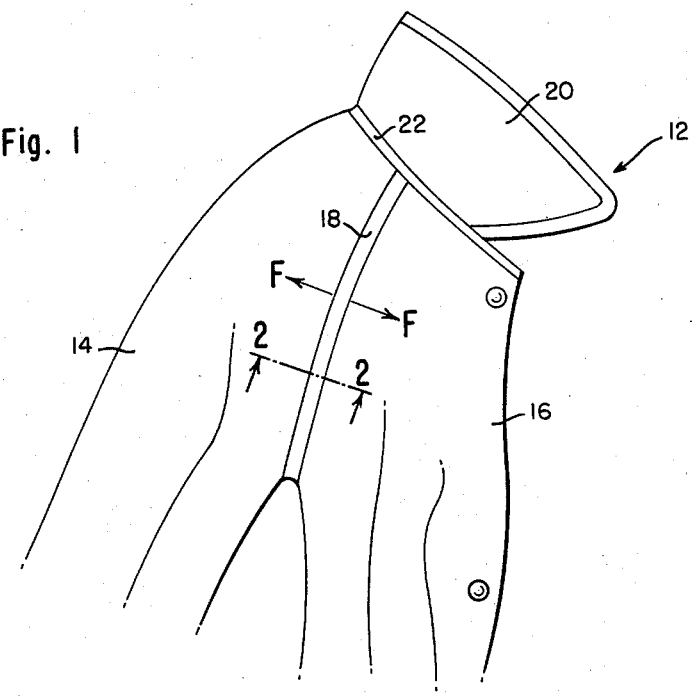
Fig. 1 is a fragmentary pictorial view of a raincoat having the improved overlapping armhole seam constructed in accordance with the invention.

Referring to Fig. 1, I show a fragmentary portion of a raincoat 12 formed of unsupported vinyl plastic sheeting and comprising a sleeve 14 and a body side panel 16, joined by an armhole seam 18. In accordance with usual practice, a collar 20 is joined to the sleeve and body panels by a seam 22 after the seam 18 has been formed.

Hitherto, the seam 18 at the armhole has been commonly a "butt" seam, with congruent margins placed in overlying relationship and with the margins to be joined superposed in substantially exact coincidence upon a suitable flat surface, regardless of curvature. A seam is then formed by pressing a dielectric induction heating bar of the same curvature upon the margins to be joined. Alternatively, the seam is formed by uniform, progressive movement of a heating element along the margins to follow the curvature thereof. In either case, the seam is completed by increasing the temperature of the plastic material to the point where it flows, thereby causing substantially complete fusion and homogeneity throughout the seam.

The definite necessity for such flowing together of the plastic materials forming the butt seam will be readily apparent. It will be seen in Fig. 1 that the principal stresses upon the seam 18 are tensile stresses in the direction indicated by the arrows F. These forces give rise to a peeling action with reference to a butt seam, that is, the tension is so applied as to tend to open the seam along a thin longitudinal line or edge. Because the stress is exceedingly great due to its concentration upon a very thin line, it is necessary to produce as complete fusion as possible, for a less complete seal has been found in practice to be incapable of effective resistance to the stresses indicated above and peeling would otherwise result.

The butt seam is subject to further objection, in that the necessary heat to form a seam that will not peel tends to cause melting and flow of the single thickness of fabric adjacent the seam in the portions of the fabric that will be subjected to the forces F. Assuming that the sheet material is substantially uniform prior to forming the seam, such flow cannot do otherwise than to cause thin spots, or even worse, to weaken the material or render it less flexible by chemical action. In any case, it is observed in actual experience that the fabric bursts under tension predominantly at points along the edge of the seam. The hole formed by forces F quickly leads to a rip along a line adjacent, but ordinarily not within, the margin of the seam.

A still further objection to the butt seam arises from the fact that it is difficult or in some cases virtually impossible to form a completely fused seam due to folds or other irregularities in the margins of the material, unequal application of pressure by the dielectric heating bar, or other factors. As a result, application of the forces F tends to cause peeling of the seam at certain points while other points hold fast due to more complete fusion. It will be readily apparent that the result is to cause concentration of stresses at the points which are more completely fused. Thus the stresses at such points exceed those at other points in the material, and when they reach the tensile strength of the material a failure occurs.

Figure 2:
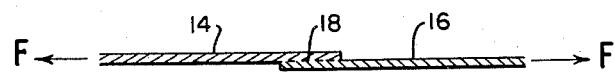
Fig. 2 is an elevation in section taken on line 2—2 of Fig. 1 and showing my improved overlapping seam construction.

To avoid the foregoing objections and to provide an improved seam, I preferably provide an overlapping seam 18 as illustrated in Figs. 1 and 2. This seam differs from the butt seam in several important respects.

First, the strength of the seam varies as its width due to the fact that the applied forces F are distributed over the whole area of the seam. This is not true of the butt seam since, as indicated above, the applied forces are resisted only by a narrow margin or edge of the latter. (For this reason, no significant advantage is derived from increasing the width of the butt seam above a nominal value of, say, one-eighth of an inch.)

Second, because of the more extensive distribution of the stresses on the overlapping seam, and also because the stresses are applied in shear rather than in tension, a given seam is stronger when used in the overlapping form than when used in the butt form.

Third, due to the reduction of stresses operative upon the seam itself, sufficient strength is achieved with less heat and greatly reduced fusion between the overlapping layers of material. A direct result of this is that the single thicknesses of material adjacent the margins of the seam are not weakened, but on the contrary retain their full strength.

Fourth, since differential peeling action has been substantially eliminated, the concentration of stresses in the material adjacent the seam which was noted with reference to the butt seam, does not arise in the improved seam.

Figure 3:
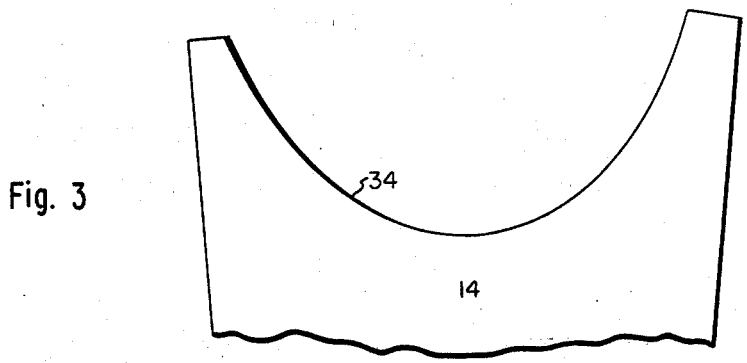
Fig. 3 is a view showing the curvature of a piece of fabric used in making an armhole seam.

A difficulty hitherto encountered in the manufacture of plastic garments or the like, as well as other seamed fabric goods in general, arises from the difficulties inherent in applying seams to fabric margins having unequal curvatures. This is well illustrated by the armhole seam 18 of Fig. 1, which is constructed of a sleeve 14 and a body panel 16, each of which when laid flat has a margin indicated by a curve 34 (Fig. 3). (It will be understood that deviations from the curve 34 as illuustrated are common, but that in any event the illustrated shape is representative.) Ordinarily, the pieces 14 and 16 are cut from patterns having identical, that is, congruent curvatures at 34, except that as applied to an overlapping seam, such curvatures are faced oppositely to one another when the margins are superposed, and I therefore refer to the margins as being unequal. But it will be further understood that while the curvatures are ordinarily identical, they may be of slightly differing shape if desired, although the margins will ordinarily have equal developed or linear lengths to avoid undesired pleating at the seam.

In any case, it will be obvious that the application of an overlapping seam along margins of unequal curvatures in mass production presents numerous problems directly arising from the inherent fact that the margins to be joined cannot be superposed in exact coincidence upon a flat work surface for application of the seam in the same manner as that used to form the butt seam. Hitherto for example, the application of a cemented overlapping seam to various goods such as rubber-coated fabric has been essentially a hand operation. In general, the method has been to apply cement to the margins of the separate pieces to be joined by means of a finger or a brush, and afterwards to superpose the respective margins manually in overlapping, opposing relationship by a progressive operation in which the fabric is manipulated, gathered and tacked by the hands as the seam is formed progressively around its periphery. After the seam is fully tacked the cementer compresses it firmly and progressively by means of a hand-held roller. It is obvious that such a semi-skilled hand operation is not only tedious but expensive.

To obviate the foregoing difficulties and to adapt the manufacture of my improved overlapping seam to the limitations of low-cost mass production techniques, I preferably use the fixture illustrated in Figs. 4 and 5. The overlapping seam is formed on a flat brass worktable 36 situated beneath a straight, vertically retractable presser bar 38, the bar 38 being connected with a dielectric heater element 39. The width of the bearing surface of the bar determines the width of the seam. The bar 38 and heater 39 are of conventional form, and include mechanical means, not shown, for elevating or lowering the bar 38 with controlled pressure upon the fabric to be sealed. The structure and operation of the heater and bar 38 are not described in detail as they are well understood in the art. It will suffice to say that the heater operates upon the principle that a high frequency voltage applied between the bar 38 and the table 36 generates heat in the intervening material by means of electrostatically-induced electrical currents therein. The delivered power and the duration of application of the high frequency voltage are controlled in accordance with the thickness of the material, and the degree of fusion, flow or liquefaction required.

For purposes of illustration, let it be assumed that it is desired to provide an overlapping seam of one-half inch width. First, a strip 40 of fabric tape of approximately one inch width, having adhesive upon its bottom side, is applied to the table 36, its length being somewhat in excess of the developed rectilinear length of the desired seam. Then, a pair of fabric strips 42 of substantially the same length and width, but having adhesive upon both sides thereof, are applied parallel to the strip 40 so that their margins partially overlie the margins of the strip 40 as indicated in the drawing. This leaves an intervening exposed surface of the strip 40 having a width substantially equal to, or slightly in excess of, the width of the bar 38. The adhesive or adhesives on the strips 42 are selected to insure a greater tendency to adhere to the table 36 than to the fabric sheeting to be joined. Finally a strip of fabric 44 preferably of the same length and width as the strip 40 is applied substantially on top of the latter so that it overlies the margins of the strips 42. The strip 44 is provided with adhesive on both surfaces, and is preferably identical with the strips 42. The described configuration provides a slightly depressed channel in the work surface beneath the bar 38 which is advantageous in aligning the margins of the material during tacking and holding it in place when the seam is formed.

In Fig. 4, the pieces 14 and 16 are shown overlapped in position for application of the seam. Since the margins of the material are curved, it is necessary to tack them in a straight line. This is accomplished as illustrated in Fig. 5. The piece 14 is illustrated as tacked in position. The piece 16 is being hand tacked by the operator, progressively from top to bottom as illustrated. While the piece 14 substantially covers the portion of the adhesive strip 44 in the channel beneath the bar 38, a portion of the strip 44 remains exposed and adheres to the piece 16. Due to the curvature of its margin, the piece 16 is bunched or gathered by the operator, and while the operation is accomplished by hand the work is facilitated by the fact that the material is being worked upon a flat surface. Very little skill is necessary. After the piece 16 has been completely tacked across the width of the strip 14 as illustrated, the bar 38 is brought down upon the overlapping margins, and the seam is completed by application of a high frequency voltage between the bar 38 and the table 36. The joined fabrics may be peeled off of the tape 44 almost immediately following upward withdrawal of the bar 38.

The power delivered by the dielectric heater 39 and the duration of its application to the seam are adjusted to cause incomplete fusion of the layers of fabric. The material is rendered tacky, but there is no material flow or commingling. In fact, when completed the seam may be peeled apart with the fingers by the appropriate application of a moderate stress substantially less than the tensile strength of the fabric. This stress, if applied to a butt seam, would have no effect because such a seam is substantially completely fused. However, incomplete fusion in an overlapping seam is not disadvantageous because the normal forces F (Fig. 1) which act on the seam are distributed and are obviously not in the appropriate direction to cause peeling as is the case with a butt seam. On the contrary, the strength against normal stresses provided by an incompletely fused overlapping seam provides an important advantage over the butt seam in that the seam or the single thicknesses of material adjacent the seam have not been weakened, hardened or caused to flow in the heating process.

A final step in the process after formation of the seam 18 is to heat the fabric slightly with the seam in a relaxed state. This tends to equalize residual stresses and to improve the appearance of the seam.

It will be appreciated from the foregoing that while I have illustrated a fixture in which the curvatures of the margins of the material are developed upon a straight line, such curvatures may be developed upon any desired non-rectilinear curve. This, of course, requires a bar 38 formed with the desired curvature. While this is ordinarily not required for the armhole seam taken by way of illustration, it may be desired for joining fabrics of relatively greater or more complex curvatures where the development thereof upon a straight line would cause excessive bunching or difficulty of handling in the tacking operation. It is anticipated upon the basis of practical tests of the invention that the problems of the art will ordinarily be accommodated by the illustrated straight line development.

Also, it will be appreciated that the tacking fixture and method herein illustrated and described have application to other forms of seam construction, which can be applied to overlapping materials when tacked and supported as illustrated. Thus for example, the margins of the material to be joined may have layers of cement previously applied thereto, in which case the bar 38 is preferably replaced by a roller similar to that used manually by cementers as previously described. In this case, since the roller is always moved rectilinearly or over a fixed predetermined curve, it may be machine-held and operated. The illustrated tacking process is adapted to the making of vulcanized seams which are formed by a well-known process in rubber or rubber-coated goods.

There is thus provided an improved method and fixture for taking curvilinear margins of fabric of unequal curvatures to form an overlapping seam therein, as well as the improved article of manufacture itself. More specifically and by way of example, there is provided an improved article of rainwear having an overlapping armhole seam with its concomitant advantages as hereinabove described in comparison with the butt seam commonly used in prior art. While the invention has been described for illustration with reference to its preferred embodiments and in accordance with the preferred method, it will be clear from the preceding remarks and description, as well as from the techniques and skills now well understood in the art, that numerous variations from the illustrated forms may be employed to suit particular applications without departing from the spirit or scope of the invention.

Having thus described the invention, I claim:

1. A fixture for joining margins of fabric including a first strip of fabric adapted to be supported by a substantially flat work surface and having an adhesive applied to the side thereof in contact with said work surface, and second and third strips of fabric supported in spaced parallel relationship with each strip overlapping an edge of said first strip, said second and third strips forming with said first strip a depressed channel to receive the margins of the fabric to be joined, said second and third strips each having contact adhesive applied to the upper and lower surfaces thereof with greater adherence to said work surface than to said fabric to be joined.

2. A fixture for joining margins of fabric including a first strip of fabric adapted to be supported by a substantially flat work surface and having an adhesive applied to the side thereof in contact with said work surface, second and third strips of fabric supported in spaced parallel relationships with each strip overlapping an edge of said first strip, and a fourth strip of fabric overlying the portion of said first strip between said second and third strips and overlapping said second and third strips, said fourth strip forming a depressed channel to receive the margins of the fabric to be joined and having contact adhesive applied to both sides thereof.

3. A process for forming an overlapping seam to join a number of pieces of fabric, said pieces having margins of unequal curvature, comprising the steps of manually bunching, gathering and adhesively tacking to a work surface the pieces to be seamed so that the curved margins of said pieces are adhesively tacked in a straight line, the tacked margin of one piece being caused to overlie that of another piece, and forming a seam in said overlying margins along a substantially straight line.

4. A process for forming an overlapping seam to join a number of pieces of fabric, said pieces having margins of unequal curvature, comprising the steps of manually bunching, gathering and adhesively tacking to a substantially flat work surface the pieces to be seamed so that the curved margins of said pieces are adhesively tacked in a line of predetermined shape in said surface, the tacked margin of one piece being caused to overlie that of another piece, and forming a seam in said overlying margins along said line.

5. A process for forming an overlapping seam to join a number of pieces of plastic sheet material, said pieces having margins of unequal curvature, comprising the steps of manually bunching, gathering and adhesively tacking to a substantially flat work surface the pieces to be seamed so that the curved margins of said pieces are adhesively tacked in a line of predetermined shape in said surface, the tacked margin of one piece being caused to overlie that of another piece, depressing a dielectric induction heating bar having an edge conforming with said line on the overlapping pieces, and producing an alternating voltage between said bar and surface to form a seam therebetween in said pieces.

References Cited in the file of this patent

UNITED STATES PATENTS

| | | |
|---|---|---|
| 1,575,562 | Feiss | Mar. 2, 1926 |
| 2,209,797 | Spencer | July 30, 1940 |
| 2,321,777 | Schelhammer et al. | June 15, 1943 |
| 2,438,429 | Callahan et al. | Mar. 23, 1948 |
| 2,441,940 | Rohdin | May 18, 1948 |
| 2,452,475 | Kraft et al. | Oct. 26, 1948 |
| 2,555,409 | Hosfield | June 5, 1951 |
| 2,570,921 | Collins | Oct. 9, 1951 |
| 2,698,273 | Miner et al. | Dec. 28, 1954 |
| 2,732,065 | Marchese | Jan. 24, 1956 |
| 2,756,431 | De Luca et al. | July 31, 1956 |

OTHER REFERENCES

Electronics: "An Electronic Sewing," August 1943, pages 90–93, 160, 162, 164, 166 and 168.